United States Patent [19]

Edmonds, Jr.

[11] 4,071,509
[45] Jan. 31, 1978

[54] ARYLENE SULFIDE POLYMER PURIFICATION

[75] Inventor: James T. Edmonds, Jr., Bartlesville, Okla.

[73] Assignee: Phillips Petroleum Company, Bartlesville, Okla.

[21] Appl. No.: 714,160

[22] Filed: Aug. 13, 1976

[51] Int. Cl.² ............................................. C08F 28/00
[52] U.S. Cl. ................................ 260/79; 260/45.7 R; 260/45.85 R; 260/79.1
[58] Field of Search ................. 260/79, 79.1, 45.85 R, 260/45.7 R

[56] References Cited

U.S. PATENT DOCUMENTS

| | | | |
|---|---|---|---|
| 3,354,129 | 11/1967 | Edmonds, Jr. et al. | 269/79 |
| 3,607,843 | 9/1971 | Vidaurri, Jr. | 260/79.1 |
| 3,839,302 | 10/1974 | Miles | 260/79 |
| 3,919,177 | 11/1975 | Campbell | 260/79.1 |
| 4,017,450 | 4/1977 | Bailey | 260/37 R |

*Primary Examiner*—Melvyn I. Marquis

[57] ABSTRACT

Arylene sulfide polymers containing ash-forming impurities or materials are purified by heating such polymers with an organic amide and an alkali metal salt selected from carboxylates, carbonates, and selected lithium halides under conditions sufficient to reduce the ash-forming impurities without extensive polymer degradation.

10 Claims, No Drawings

ARYLENE SULFIDE POLYMER PURIFICATION

This invention relates to the purification of arylene sulfide polymers containing ash-forming impurities. In accordance with another aspect, this invention relates to a process for the reduction of ash-forming impurities contained in arylene sulfide polymers without extensive degradation of the polymer by heating the polymer with an organic amide and selected alkali metal salts. In accordance with a further aspect, this invention relates to a process for the reduction of ash-forming impurities present in arylene sulfide polymers by heating the polymer with an organic amide and an alkali metal salt selected from carboxylates, carbonates, and selected lithium halides under conditions of temperature and contact time sufficient to reduce the ash content appreciably without extensive degradation of the polymer. In accordance with another aspect, the alkali metal salt is at least partially dehydrated by heating prior to being contacted with the polymer. In accordance with a further aspect, water is added to a mixture of organic amide and an alkali metal salt prior to heating with an arylene sulfide polymer containing ash-forming impurities.

In applications such as in the production of fibers and films from arylene sulfide polymers, it is desirable that the amount of ash-forming impurities in the arylene sulfide polymer be as low as possible without resorting to methods which would result in excessive degradation of the polymer. This invention provides a method for achieving this objective.

Accordingly, an object of this invention is to provide a process for the purification of arylene sulfide polymers containing ash-forming impurities.

A further object of this invention is to provide an improved process for the reduction of ash-forming impurities contained in arylene sulfide polymers without extensive degradation of the polymer.

A further object of this invention is to provide arylene sulfide polymers having increased utility by reducing the ash-forming impurities present in the polymers.

Other objects, aspects, and the several advantages of the invention will be apparent to those skilled in the art upon a study of the specification and the appended claims.

Broadly, according to the invention, the amount of ash-forming impurities contained in arylene sulfide polymers is reduced by heating the polymer with an organic amide and an alkali metal salt under conditions of temperature and time sufficient to appreciably reduce the amount of ash-forming impurities without extensive degradation of the polymer.

In accordance with this invention, the amount of ash-forming impurities in an arylene sulfide polymer containing such impurities in an amount of at least 0.10 weight percent (determined by burning a sample in a crucible over an open flame, followed by further heating of the sample in a furnace at 538° C for four hours, the amount of ash being expressed as weight percent of the amount of sample used) is reduced by heating the arylene sulfide polymer with an organic amide and an alkali metal salt selected from the group consisting of alkali metal carboxylates, alkali metal carbonates, and lithium halides selected from lithium chloride, lithium bromide, and lithium iodide, the alkali metal salt being used in an amount sufficient to inhibit degradation of the polymer or to increase the molecular weight of the polymer.

In accordance with specific embodiments of the invention, the alkali metal salt can be employed in the anhydrous or hydrated form. In one embodiment, at least the alkali metal salt, when at least partially hydrated, and, if desired, also the organic amide can be heated under conditions to at least partially dehydrate the alkali metal salt prior to contact with the arylene sulfide polymer containing ash-forming impurities and heating of the resulting mixture.

In a further embodiment, a mixture of the organic amide and alkali metal salt is formed and water added thereto prior to admixture with the polymer and heating to reduce the amount of ash-forming impurity present in the polymer.

Arylene sulfide polymers which can be employed in the process of this invention include arylene sulfide polymers generally which contain ash-forming impurities as specified above and which have a melt flow of at least 1, and preferably within the range of about 5 to about 1,000 (determined by the method of ASTM D 1238-70, modified to a temperature of 316° C using a 5-kg weight, the value being expressed as g/10 min). Thus, the arylene sulfide polymers can be linear, branched, or lightly crosslinked. Although the method by which the polymers of this description are produced is not critical, preferably the polymer employed in the process is prepared by use of polyhalo aromatic compounds, alkali metal sulfides, and organic amides. For example, the arylene sulfide polymer for use in this invention can be produced by the method of U.S. Pat. No. 3,354,129. Preferably, the polymer employed is prepared by use of a p-dihalobenzene, an alkali metal sulfide, an organic amide, and an alkali metal carboxylate, as in U.S. Pat. No. 3,919,177, optionally together with an alkali metal hydroxide such as sodium hydroxide, e.g., in an amount up to about 0.8 mole of alkali metal hydroxide per mole of alkali metal sulfide. and/or a polyhalo aromatic compound such as 1,2,4-trichlorobenzene, e.g., in an amount up to about 0.6 part by weight per 100 parts by weight p-dihalobenzene. If desired, a lithium halide such as lithium chloride can be used instead of the alkali metal carboxylate to produce the polymer. If desired, water which can be present with the reactants can be removed by distillation prior to the polymerization reaction.

Organic amides which can be used in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, $\epsilon$-caprolactam, N-methyl-$\epsilon$-caprolactam, N,N'-ethylenedi-2-pyrrolidone, tetramethylurea, and the like, and mixtures thereof.

Alkali metal carboxylates which can be employed in the process of this invention can be represented by the formula $RCO_2M$, where R is a hydrocarbyl radical selected from the group consisting of alkyl, cycloalkyl, and aryl, and combinations thereof such as alkaryl, aralkyl, and the like, the hydrocarbyl radical having 1 to about 20 carbon atoms, and M is an alkali metal selected from the group consisting of lithium, sodium, potassium, rubidium, and cesium. Thus, examples of some alkali metal salts selected from the group consisting of alkali metal carboxylates, alkali metal carbonates, and lithium halides as specified hereinabove, which can be employed in the process of this invention, include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, lithium benzoate, sodium benzoate, potassium benzoate, potassium m-toluate, lithium phenylacetate, sodium 4-phenylcyclohexanecarboxylate, potassium p-tolylacetate, lithium 4-ethylcyclohexylacetate, lithium carbonate, sodium carbonate, potassium carbonate, rubidium carbonate, cesium carbonate, lithium chloride, lithium bromide, lithium iodide, and the like, and mixtures thereof. The alkali metal salts as hereinabove defined for use in the process of this invention can be employed in anhydrous or hydrated form. If desired, free water can be employed with the alkali metal salt in an amount such as to provide up to about 5 g-moles of water, including any water of hydration of the salt, per g-mole of alkali metal salt.

It is to be understood that the process of this invention can be carried out by mixing the arylene sulfide polymer containing ash-forming impurities, the organic amide, and the alkali metal salt in any order. It is also to be understood that a composite can be formed of any two of these substances with the remaining substance or substances being introduced into the composite. Furthermore, it is to be understood that these substances can be employed in the form of aqueous mixtures or hydrates or partially hydrated and that subsequent to any step of contacting the substances water can be removed from the resulting composition, e.g., by heating, distilling, and the like. For instance, water can be removed by distillation from a mixture of the organic amide and the alkali metal salt, e.g., in hydrated form or as an aqueous mixture, after which the residual mixture can be admixed with the aromatic sulfide polymer and the resulting mixture then maintained at heating conditions sufficient to reduce the ash-forming impurities but without extensive degradation of the polymer. In one embodiment, the alkali metal salt and the organic amide are combined to form a mixture which is heated at an elevated temperature for a period of time sufficient to effect dehydration of the mixture, followed by addition of the aromatic sulfide polymer containing ash-forming impurities to the heated mixture with or without cooling prior to addition of the polymer, and then subjecting the resulting mixture to heating conditions which reduce the ash-forming impurities without extensive degradation of the polymer.

The heating to effect at least partial dehydration of the salt can be carried out at a temperature in the range of about 170° C to about 240° C, preferably a temperature of about 200° C to about 210° C. This heating to effect dehydration is ordinarily carried out in presence of the organic amide, and the heated mixture can be mixed while hot with the arylene sulfide polymer or cooled, if desired, prior to mixing with the arylene sulfide polymer containing ash-forming impurities.

Although the weight ratio of organic amide to arylene sulfide polymer in the process of this invention can vary over a wide range, generally it will be within the range of about 1:1 to about 20:1, preferably about 3:1 to about 15:1. The amount of alkali metal salt employed can vary greatly but generally will be within the range of about 0.05 to about 4, preferably about 0.1 to about 2, g-moles per 100 g of arylene sulfide polymer.

Although the temperature at which the mixture comprising the arylene sulfide polymer, organic amide, and alkali metal salt is heated can vary over a wide range in the process of this invention, generally the temperature will be within the range of about 150° C to about 280° C, preferably about 200° C to about 270° C. The time can vary greatly, depending in part on the temperature and the nature of the arylene sulfide polymer, but generally will be within the range of about 5 minutes to about 10 hours, preferably about 30 minutes to about 4 hours. The pressure should be sufficient to maintain the organic amide substantially in the liquid phase. Preferably, the heating is conducted in an inert atmosphere such as nitrogen, helium, or the like.

The process of this invention can be conducted batchwise or continuously.

After the mixture comprising arylene sulfide polymer, organic amide, and alkali metal salt has been heated at the desired temperature for the desired period of time, the purified polymer is separated from the other components of the mixture by conventional procedures, e.g., by filtration of the polymer, followed by washing with water, or by dilution of the mixture with water, followed by filtration and water washing of the polymer.

EXAMPLES

In the following examples, melt flow values were determined by the method of ASTM D 1238-70, modified to a temperature of 600° F (316° C) using a 5-kg weight, the value being expressed as g/10 min. Values for inherent viscosity were determined at 206° C in 1-chloronaphthalene at a polymer concentration of 0.4 g/100 ml solution. Values for ash were determined by burning a sample in a crucible over an open flame, followed by further heating of the sample in a furnace at 1000° F (538° C) for 4 hours, the amount of ash being expressed as weight percent of the amount of sample used. Unless otherwise designated, "mole" or "moles" is meant to represent "g-mole" or "g-moles."

EXAMPLE I

Branched poly(phenylene sulfide) (PPS) for use in Examples I and II was prepared in the following manner. Sodium sulfide (983.7 g, 60 percent assay, 7.56 moles), lithium acetate dihydrate (765 g, 7.50 moles), sodium hydroxide (46.8 g, 1.17 moles), and N-methyl-2-pyrrolidone (3,000 ml, 3,078 g) were charged to a 2-gallon (7.6 liter) autoclave, equipped with stirrer, which was then flushed with nitrogen. Dehydration of the mixture by heating to 405° F (207° C) gave 685 ml of distillte comprising primarily water. To the residual mixture were charged 1,137 g (7.73 moles) p-dichlorobenzene, 1.5 g (0.0083 mole) 1,2,4-trichlorobenzene, and 500 ml (513 g) N-methyl-2-pyrrolidone. The resulting mixture was heated for two hours at 400° F (204° C) and then for three hours at 510° F (266° C), during which time the pressure reached a maximum of 165 psig. The reaction product was cooled, washed four times with hot water, and dried to obtain 711.7 g of branched PPS having a melt flow of 66, an inherent viscosity of 0.31, and a value for ash of 0.12 weight percent.

In a control run outside the scope of this invention, 300 g of the above branched PPS having a melt flow of 66 and 3,000 ml (3,078 g) of N-methyl-2-pyrrolidone were charged to a 2-gallon (7.6 liter) autoclave, equipped with stirrer, which was then flushed with nitrogen. The mixture was heated for two hours at 501° F (266° C), during which time the maximum pressure was 80 psig. The resulting mixture was cooled, washed four times with hot water, and dried to obtain branched PPS having a melt flow of 1,366, an inherent viscosity of 0.18, and a value for ash of 0.01 weight percent. Thus, the value for ash was reduced markedly. However, the melt flow increased greatly, indicating substantial degradation of the branched PPS starting material occurred during the heating process.

EXAMPLE II

In a run within the scope of this invention, 300 9 of the branched PPS of Example I having a melt flow of 66, 150 g (3.5 moles) of lithium chloride, and 3,000 ml (3,078 g) of N-methyl-2-pyrrolidone were charged to a 2-gallon (7.6 liter) autoclave, equipped with stirrer, which was heated for two hours at 510° F (266° C), during which time the maximum pressure was 100 psig. The resulting mixture was cooled, washed four times with hot water, and dried to obtain branched PPS having a melt flow of 48, an inherent viscosity of 0.33, and a value for ash of 0.02 weight percent.

Thus, the heating process resulted in a decrease in melt flow of the polymer instead of an increase in melt flow and substantial degradation of the polymer, as occurred in the control run in Example I. At the same time, the heating process markedly reduced the amount of ash-forming impurities in the polymer.

EXAMPLE III

Branched PPS for use in Examples III and IV was prepared as follows. Sodium sulfide (983.7 g, 60 percent assay, 7.56 moles), lithium acetate dihydrate (765 g, 7.50 moles), sodium hydroxide (46,8 g, 1.17 moles), and N-methyl-2-pyrrolidone (3,000 ml., 3,078 g) were charged to a 2-gallon (7.6 liter) autoclave, equipped with stirrer, which was then flushed with nitrogen. Dehydration of the mixture by heating to 407° F (208° C) gave 730 ml of distillate comprising primarily water. To the residual mixture were charged 1,137 g (7.73 moles) p-dichlorobenzene, 1.5 g (0.0083 mole) 1,2,4-trichlorobenzene, and 500 ml (513 g) N-methyl-2-pyrrolidone. The resulting mixture was heated for one hour at 400° F (204° C) and then for three hours at 510° F (266° C), during which time the pressure reached a maximum of 165 psig. The reaction product was cooled, washed four times with hot water, and dried to obtain 655.2 g of branched PPS having a melt flow of 67, an inherent viscosity of 0.33, and a value for ash of 0.14 weight percent.

In a control run outside the scope of this invention, 300 g of the above branched PPS having a melt flow of 67 and 3,000 ml (3,078 g) of N-methyl-2-pyrrolidone were charged to a 2-gallon (7.6 liter) autoclave, equipped with stirrer, which was then flushed with nitrogen. The mixture was heated for three hours at 510° F (266° C), during which time the maximum pressure was 100 psig. The resulting mixture was cooled, washed four times with hot water, and dried to obtain branched PPS having a melt flow of 1,537, an inherent viscosity of 0.19 and a value for ash of 0.02 weight percent. Thus, although the value for ash was reduced, substantial degradation of the branched PPS starting material occurred during the heating process, as evidenced by the values for melt flow before and after the heating.

EXAMPLES IV

In a run within the scope of this invention, 300 g of the branched PPS of Example III having a melt flow of 67, 150 g (3.5 moles) of lithium chloride, and 3,000 ml (3,078 g) of N-methyl-2-pyrrolidone were charged to a 2-gallon (7.6 liter) autoclave, equipped with stirrer, which was then flushed with nitrogen. The mixture was heated for three hours at 510° F (266° C), during which time the maximum pressure was 85 psig. The resulting mixture was cooled, washed four times with hot water, and dried to obtain branched PPS having a melt flow of 47, an inherent viscosity of 0.33, and a value for ash of 0.02 weight percent.

Thus, the heating process resulted in a decrease in melt flow of the polymer instead of the increase in melt flow and substantial degradation of the polymer observed in the control run in Example III. At the same time, the heating process resulted in a lower value for ash.

EXAMPLE V

Branched PPS for use in Examples V through X was prepared as follows. To a 95-gallon (360 liter) reactor equipped with stirrer were charged 25.0 gallons (96.8 kg) N-methyl-2-pyrrolidone and 85.0 lb (38.6 kg, 0.38 kg-mole) lithium acetate dihydrate. The resulting mixture was then dehydrated by heating to a distillation temperature of 391° F (199° C), yielding 31.6 lb (14.3 kg) of distillate comprising primarily water. The reactor was then cooled to 177° F (81° C). To the residual mixture were added 111.4 lb (50.6 kg, 58,3 percent assay, 0.38 kg-mole) sodium sulfide and 4.3 lb (2.0 kg, 0.05 kg-mole) sodium hydroxide, after which 13.5 gallons (52.2 kg, 0.53 kg-mole) N-methyl-2-pyrrolidone was added. Dehydration of the mixture by heating to a distillation temperature of 390° F (199° C) yielded 28.6 lb (13.0 kg) of distillate comprising primarily water. To the residual mixture were added 122.2 lb (55.5 kg, 0.38 kg-mole) p-dichlorobenzene and 166.3 g (0.92 g-mole) 1,2,4-trichlorobenzene. The resulting mixture was heated to 400° F (204° C) and maintained at this temperature for three hours at a pressure of about 25 psig, after which the mixture was heated to about 510° F (266° C) and maintained at this temperature for three hours at a pressure of about 145 psig. To the reactor was then added 4.0 lb (1.8 kg) carbon dioxide at 200 psig over a period of about one hour to inhibit decomposition of the arylene sulfide polymer. The reactor was then maintained at about 510° F (266° C) for 30 minutes, during which time the reactor pressure dropped to 174 psig. The reaction mixture was concentrated by removing 164.1 lb (74.5 kg) of distillate comprising primarily N-methyl-2-pyrrolidone, the distillation being conducted under conditions such that the initial pressure was 174 psig and the initial pot temperature was about 510° F (266° C), and the final pressure was 27 psig and the final pot temperature was 478° F (248° C). The reactor containing the residual mixture was then pressured with 9.0 lb (4.1 kg) carbon dioxide, after which the reactor was heated to 540° F (282° C), resulting in a pressure of about 195 psig. The mixture was then fed to an agitated flash chamber, during which time most of the N-methyl-2-pyrrolidone flash vaporized. The remaining N-methyl-2-pyrrolidone was removed by evaporation over a period of two hours, the final temperature of the residual product being about 400° F (204° C). The resulting solid material was cooled, washed with water, and dried. The branched PPS product had a melt flow of 17, an inherent viscosity of 0.35, and a value for ash of 0.62 weight percent.

In a control run outside the scope of this invention, 650 g of the above branched PPS having a melt flow of 17 and 3,500 ml (3,591 g) of N-methyl-2-pyrrolidone were charged to a 2-gallon (7.6 liter) autoclave, equipped with stirrer, which was then flushed with nitrogen. The mixture was heated for three hours at 510° F (266° C), during which time the maximum pressure was 70 psig. The resulting mixture was cooled, washed four times with hot water, and dried to obtain 610.2 g of branched PPS having a melt flow of 439, an inherent viscosity of 0.20, and a value for ash of 0.24 weight percent. Thus, although the value for ash was reduced, the melt flow increased greatly, indicating substantial degradation of the branched PPS.

EXAMPLE VI

In a run within the scope of this invention, 613 g (6.0 moles) of lithium acetate dihydrate, 650 g of the branched PPS of Example V having a melt flow of 17, and 3,500 ml (3,591 g) of N-methyl-2-pyrrolidone were charged to a 2-gallon (7.6 liter) autoclave, equipped with stirrer, which was then flushed with nitrogen. The mixture was heated for three hours at 510° F (266° C), during which time the maximum pressure was 195 psig. The resulting mixture was cooled, washed four times with hot water, and dried to obtain 561.3 g of branched PPS having a melt flow of 3.3, an inherent viscosity of 0.29, and a value for ash of 0.11 weight percent.

Thus, the heating process resulted in a decrease in melt flow of the polymer instead of an increase in melt flow and substantial degradation of the polymer, as occurred in the control run in Example V. At the same time, the heating process markedly reduced the amount of ash-forming impurities in the polymer.

EXAMPLE VII

In a run within the scope of this invention, which was conducted in essentially the same manner as the run in Example VI except that a dehydration step was employed, 613 g (6.0 moles) of lithium acetate dihydrate and 3,500 ml (3,591 g) of N-methyl-2-pyrrolidone were charged to a 2-gallon (7.6 liter) autoclave, equipped with a stirrer, which was then flushed with nitrogen. Dehydration of the mixture by heating to 400° F (204° C) gave 260 ml of distillate comprising primarily water. The autoclave was cooled to 200° F (93° C), 650 g of the branched PPS of Example V having a melt flow of 17 was added, and the autoclave was flushed with nitrogen. The contents of the autoclave were heated for three hours at 510° F (266° C), during which time the maximum pressure was 50 psig. The resulting mixture was cooled, washed four times with hot water, and dried to obtain 567.2 g of branched PPS having a melt flow of 13, an inherent viscosity of 0.32, and a value for ash of 0.16 weight percent.

Thus, the melt flow of the polymer decreased during the run instead of increasing, and therefore the polymer did not undergo the substantial degradation which it underwent in the control run in Example V. Again, the resulting polymer gave a lower value for ash than did the starting polymer.

EXAMPLE VIII

In a run within the scope of this invention, comparable to the control run in Example V but using sodium carbonate monohydrate and less N-methyl-2-pyrrolidone, 650 g of the branched PPS of Example V having a melt flow of 17, 3,000 ml (3,078 g) of N-methyl-2-pyrrolidone, and 111 g (0.9 mole) of sodium carbonate monohydrate were charged to a 2-gallon (7.6 liter) autoclave, equipped with stirrer, which was then flushed with nitrogen. The mixture was heated for three hours at 510° F (266° C), during which time the maximum pressure was 70 psig. The resulting mixture was cooled, washed four times with hot water, and dried to obtain 605.5 g of branched PPS having a melt flow of 193, an inherent viscosity of 0.29, and a value for ash of 0.42 weight percent.

The use of 3,000 ml of N-methyl-2-pyrrolidone, as in the runs in this example and Examples IX and X, would not be expected to lead to results significantly different than would have been obtained had 3,500 ml of N-methyl-2-pyrrolidone been used, as in the control run in Example V.

Thus, based on values for melt flow, the extent of degradation was much less than in the control run in Example V. The value for ash was reduced significantly.

EXAMPLE IX

In a run within the scope of this invention, comparable to the control run in Example V but using anhydrous sodium acetate and less N-methyl-2-pyrrolidone, 650 g of the branched PPS of Example V having a melt flow of 17, 3,000 ml (3,078 g) of N-methyl-2-pyrrolidone, and 494 g (6.0 moles) of anhydrous sodium acetate were charged to a 2-gallon (7.6 liter) autoclave, equipped with stirrer, which was then flushed with nitrogen. The mixture was heated for three hours at 510° F (266° C), during which time the maximum pressure was 80 psig. The resulting mixture was cooled, washed four times with hot water, and dried to obtain 617.9 g of branched PPS having a melt flow of 87, an inherent viscosity of 0.27, and a value for ash of 0.13 weight percent.

Thus, based on values for melt flow, the extent of degradation was far less than in the control run in Example V. The value for ash was reduced greatly.

EXAMPLE X

In a run within the scope of this invention, comparable to the control run in Example V but using sodium acetate and water, and less N-methyl-2-pyrrolidone, 650 g of the branched PPS of Example V having a melt flow of 17, 3,000 ml (3,078 g) of N-methyl-2-pyrrolidone, 494 g (6.0 moles) of anhydrous sodium acetate, and 108 g (6.0 moles) of water were charged to a 2-gallon (7.6 liter) autoclave, equipped with stirrer, which was then flushed with nitrogen. The mixture was heated for three hours at 510° F (266° C), during which time the maximum pressure was 125 psig. The resulting mixture was cooled, washed four times with hot water, and dried to obtain 634.6 g of branched PPS having a melt flow of 18, an inherent viscosity of 0.36, and a value for ash of 0.11 weight percent.

Thus, based on values for melt flow, little, if any, degradation of the branched PPS occurred, in contrast with the substantial degradation which was observed in the control run in Example V. The value for ash was reduced greatly.

I claim:

1. A process for the reduction of ash-forming impurities contained in arylene sulfide polymers without extensive degradation of the polymer which comprises:
   a. forming a mixture comprising an arylene sulfide polymer containing at least 0.10 weight percent ash-forming impurities or materials, an organic amide, and at least one alkali metal salt selected from the group consisting of alkali metal carboxylates, alkali metal carbonates, and lithium halides selected from the group consisting of lithium chloride, lithium bromide, and lithium iodide, the amount of alkali metal salt present being sufficient to inhibit degradation of the polymer or to increase the molecular weight of the polymer, and
   b. heating said mixture formed in (a) at an elevated temperature and for a period of time sufficient to produce an arylene sulfide polymer of appreciably reduced ash content without extensive degradation of said polymer.

2. A process according to claim 1 wherein at least the alkali metal salt is heated, prior to forming the mixture in (a), at an elevated temperature sufficient to effect at least partial dehydration of said alkali metal salt.

3. A process according to claim 1 wherein said organic amide and said alkali metal salt are heated at an elevated temperature sufficient to effect dehydration prior to addition of polymer to form said mixture in (a).

4. A process according to claim 1 wherein water is added to the mixture of (a) prior to heating in (b).

5. A process according to claim 1 wherein the temperature in (b) is in the range of about 150° C to about 280° C and said heating is effected under sufficient pressure to maintain the organic amide substantially in the liquid phase, the weight ratio of organic amide to arylene sulfide polymer is within the range of about 1:1 to about 20:1, and the amount of alkali metal salt present ranges from about 0.05 to about 4 g-moles per 100 g of arylene sulfide polymer.

6. A process according to claim 1 wherein said arylene sulfide polymer is poly(phenylene sulfide), said organic amide is N-methyl-2-pyrrolidone, and said alkali metal salt is lithium chloride, lithium acetate dihydrate, sodium carbonate monohydrate, or sodium acetate.

7. A process according to claim 3 wherein said arylene sulfide polymer is poly(phenylene sulfide), said organic amide is N-methyl-2-pyrrolidone, and said alkali metal salt is lithium acetate dihydrate, and the mixture of N-methyl-2-pyrrolidone and lithium acetate dihydrate is heated under conditions such that the mixture is substantially dehydrated, cooled, and then mixed with poly(phenylene sulfide).

8. A process according to claim 4 wherein said arylene sulfide polymer is poly(phenylene sulfide), said organic amide is N-methyl-2-pyrrolidone, and said alkali metal salt is sodium acetate.

9. A process according to claim 1 wherein the temperature in (b) is in the range of about 200° C to about 270° C, the pressure is sufficient to maintain the organic amide under liquid phase conditions, the weight ratio of organic amide to arylene sulfide polymer ranges from about 3:1 to about 15:1, and the amount of alkali metal salt employed ranges from about 0.1 to about 2 g-moles per 100 g of arylene sulfide polymer.

10. A process according to claim 1 wherein said organic amide is a cyclic or acyclic amide having from 1 to about 10 carbon atoms per molecule, and said alkali metal carboxylates can be represented by the formula $RCO_2M$ where R is a hydrocarbyl radical having from 1 to about 20 carbon atoms and M is an alkali metal.

* * * * *